(12) United States Patent
Krajewski

(10) Patent No.: US 9,664,240 B2
(45) Date of Patent: May 30, 2017

(54) MOTOR VEHICLE DRIVE TRAIN ARRANGEMENT

(71) Applicant: Christian Krajewski, Ostflidem-Ruit (DE)

(72) Inventor: Christian Krajewski, Ostflidem-Ruit (DE)

(73) Assignee: DAIMLER AG, Stuttgart (DE)

( * ) Notice: Subject to any disclaimer, the term of this patent is extended or adjusted under 35 U.S.C. 154(b) by 0 days.

(21) Appl. No.: 13/757,803

(22) Filed: Feb. 3, 2013

(65) Prior Publication Data

US 2014/0221157 A1  Aug. 7, 2014

(51) Int. Cl.
*F16D 48/06* (2006.01)
*B60K 17/36* (2006.01)
*B60K 17/35* (2006.01)

(52) U.S. Cl.
CPC .......... *F16D 48/06* (2013.01); *B60K 17/3505* (2013.01); *B60K 17/36* (2013.01); *B60K 17/3515* (2013.01); *F16D 2500/10425* (2013.01); *F16D 2500/30406* (2013.01); *F16D 2500/3108* (2013.01); *F16D 2500/50858* (2013.01); *Y10T 477/755* (2015.01)

(58) Field of Classification Search
CPC B60K 17/36; B60K 17/3505; B60K 17/3515; F16D 48/06; F16D 2500/3108; F16D 2500/10425; F16D 2500/30406; F16D 2500/50858; Y10T 477/755

USPC .......................................................... 180/248
See application file for complete search history.

(56) References Cited

U.S. PATENT DOCUMENTS

| 4,936,406 | A | * | 6/1990 | Tezuka | B60K 23/0808 180/249 |
| 5,119,900 | A | * | 6/1992 | Watanabe | B60K 23/0808 180/245 |
| 5,894,904 | A | | 4/1999 | Yakou et al. | |
| 2011/0218715 | A1 | * | 9/2011 | Duraiswamy et al. | 701/51 |

FOREIGN PATENT DOCUMENTS

| DE | 40 39 392 | 6/1991 |
| DE | 40 39 392 A1 | 6/1991 |
| DE | 10 2006 045 007 | 2/2008 |
| JP | 01 148627 | 6/1989 |
| JP | 10 166878 | 6/1998 |
| JP | 2004 316892 | 11/2004 |
| RU | 2086430 | 8/1997 |
| SU | 1168440 | 7/1985 |

* cited by examiner

*Primary Examiner* — Joseph Rocca
*Assistant Examiner* — Felicia L Brittman
(74) *Attorney, Agent, or Firm* — Klaus J. Bach

(57) ABSTRACT

In a motor vehicle drive train arrangement with at least one main drive train for driving a main drive axle, and at least one auxiliary drive train which is driven via the main drive train and connected to a secondary drive axle which can be driven via the auxiliary drive train, the secondary drive axle is linked to the auxiliary drive train without an axle differential and the secondary drive axle includes controllable couplers for selectively coupling the secondary drive axle wheels to the auxiliary drive train.

7 Claims, 1 Drawing Sheet

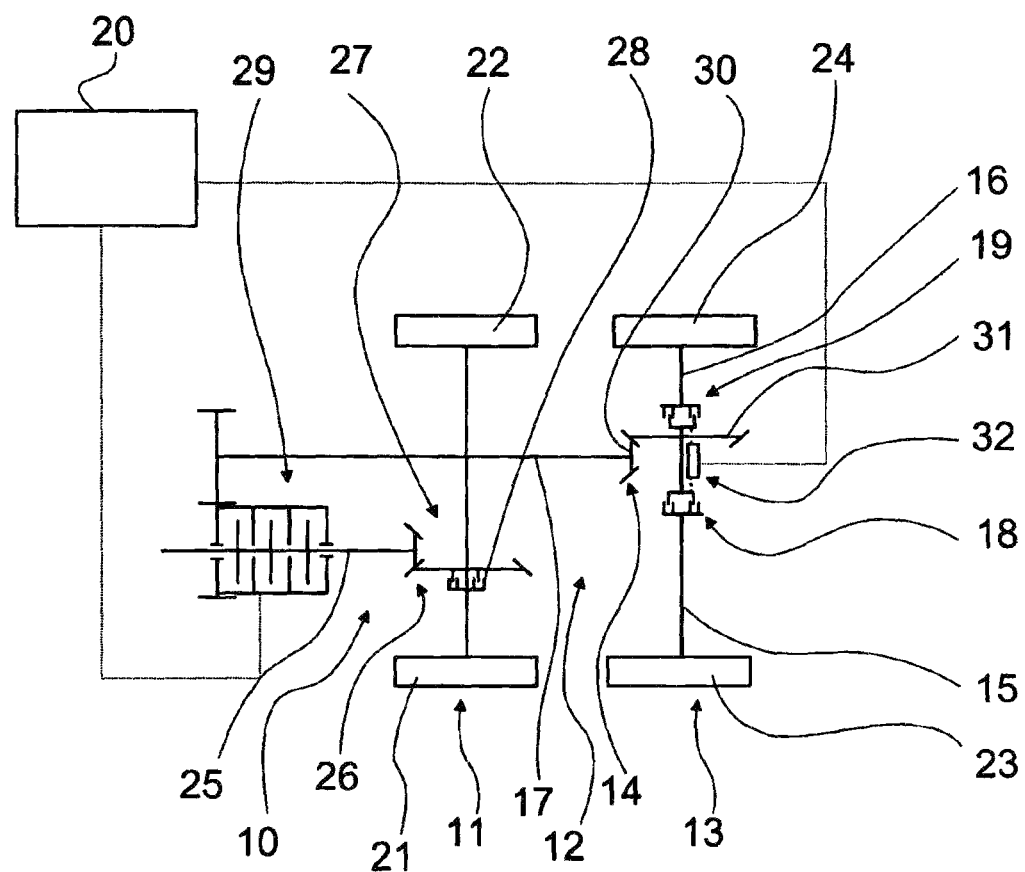

MOTOR VEHICLE DRIVE TRAIN ARRANGEMENT

This is a Continuation-In-Part application of pending international patent application PCT/EP2011/003766 filed Jul. 27, 2011 and claiming the priority of German patent application 10 2010 034 224.6 filed Aug. 7, 2010.

BACKGROUND OF THE INVENTION

The invention relates to a motor vehicle drive train arrangement including a main drive train for driving a main axle and an auxiliary drive train for driving a secondary drive axle.

A motor vehicle drive train device with at least one main drive train for driving a main drive axle, with at least one auxiliary drive train which is driven via the main drive train and with a secondary drive axle which can be driven via the auxiliary drive train is already known from DE 10 2006 045 007 A1.

DE 40 39 392 A1 furthermore discloses a motor vehicle drive train with a main drive train and an auxiliary drive train, the auxiliary drive train being able to be coupled to the main drive train by means of a cut-off clutch and uncoupled from the main drive train, and a secondary drive axle being linked to the auxiliary drive train without an axle differential. The secondary drive axle in this case has a first and a second multi-disk clutch.

U.S. Pat. No. 5,894,904 A discloses a motor vehicle drive train, with an auxiliary drive train being linked to a main drive train without a differential. A secondary drive axle of the auxiliary drive train in this case has a first and a second multi-disk clutch.

It is the object of the present invention to provide a structurally simple and hence in particular inexpensive motor vehicle drive train for driving main and secondary axles.

SUMMARY OF THE INVENTION

In a motor vehicle drive train with at least one main drive train for driving a main drive axle and at least one auxiliary drive train which is driven via the main drive train and connected to a secondary drive axle which can be driven via the auxiliary drive train, the secondary drive axle is linked to the auxiliary drive train without an axle differential and the secondary axle includes controllable couplers for selectively coupling the secondary drive axle wheels to the auxiliary drive train.

The fact that the secondary drive axle is linked to the auxiliary drive train without an axle differential means that a differential can be omitted. As a result, the number of components can be kept small. This means that in particular construction costs can be lowered, as a result of which in particular an inexpensive motor vehicle drive train can be provided. A "drive axle" in this case is to be understood to mean in particular an arrangement of components which are arranged coaxially to each other which are provided for driving a motor vehicle. The drive axle in this case comprises, for transmitting a drive torque, in particular two drive wheels and two wheel drive shafts, which are each connected for co-rotation to one of the drive wheels. In this case. "at least without an axle differential" is to be understood to mean in particular that at least one axle differential for a speed compensation between the drive wheels of the drive axle is dispensed with, i.e. that the drive wheels of the secondary drive axle are linked and/or can be linked to the auxiliary drive train merely at synchronized speeds. Advantageously, a center differential for a speed compensation between the main drive train and the auxiliary drive train is also dispensed with.

It is further proposed that the motor vehicle drive train has a conversion gear which is provided to connect two wheel drive shafts to an auxiliary drive shaft at synchronized speeds. This means that the secondary drive axle can be linked to the auxiliary drive train in a particularly structurally simple manner. "Connect at synchronized speeds" is to be understood to mean in particular that a speed of the wheel drive shafts is always the same and the wheel drive shafts have in particular a fixed transmission ratio to an auxiliary drive shaft.

Furthermore, it is proposed that the secondary drive axle has a first coupler and a second coupler which are provided to connect the two wheel drive drive shafts [sic] individually to the auxiliary drive shaft. This means that a differential functionality for the second drive axle can be brought about in structurally simple manner. A "differential functionality" in this case is to be understood to mean in particular a compensation functionality which is provided to make available a difference in speeds between the two drive wheels. A "coupler" is to be understood to mean in particular a unit which is provided to connect together for co-rotation two shafts which are arranged rotatably relative to each other.

Further, it is proposed that the motor vehicle drive train device has a control and/or regulating unit which is provided to select a normal operating mode, a standby operating mode and an auxiliary operating mode. This means that the motor vehicle drive train can be set in a simple manner to the most beneficial operating mode for a driving situation. A "normal operating mode" in this case is to be understood to mean in particular an operating mode in which a drive torque is transmitted merely via the drive wheels of the main drive axle. An "auxiliary operating mode" is to be understood to mean in particular an operating mode in which a drive torque is transmitted via the drive wheels of the main drive axle and the secondary drive axle. A "standby operating mode" is to be understood to mean in particular an operating mode which is different from the normal operating mode and from the auxiliary operating mode and which is provided in particular for engaging the auxiliary operating mode. A "control and/or regulating unit" is to be understood to mean in particular a unit with at least one control unit. A control unit is to be understood to mean in particular a unit with a processor unit and with a memory unit, and with an operating program stored in the memory unit. In principle, the control and/or regulating unit may have a plurality of interconnected control units which are preferably provided to communicate with each other via a bus system, such as in particular a CAN bus system. "Provided" is to be understood to mean in particular specially programmed, equipped and/or designed.

Further, it is proposed that the control and/or regulating unit be provided to open one of the two couplers for selecting the standby operating mode. This means that the differential functionality can be selected in a simple manner.

It is further proposed that the control and/or regulating unit can close one of the two couplers for selecting the standby operating mode. This means that the differential functionality can be selected particularly advantageously.

In a further embodiment, it is proposed that the control and/or regulating unit be provided to close both couplers for selecting the auxiliary operating mode. This means that driving can take place particularly simply via two drive wheels.

Furthermore, the control and/or regulating unit can select the auxiliary operating mode dependent on a slip of the main drive axle. This means that a slip of the main drive axle can be counteracted advantageously and simply. A "slip of the main drive axle" in this connection is to be understood to mean in particular slipping of at least one of the drive wheels of the main drive axle. The control and/or regulating unit can determine the slipping of the main drive axle in particular using a difference in speed between the main drive axle and a driveless secondary drive axle.

In addition, the control and/or regulating unit can select the standby operating mode or the auxiliary operating mode below a defined limit speed. This means that the motor vehicle drive train can be prepared particularly simply for implementation of the auxiliary operating mode, which means that the auxiliary operating mode can be implemented rapidly when needed. The limit speed in this case is preferably at most 50 km/h, with at most 40 km/h being advantageous and at most 30 km/h being particularly advantageous.

The control and/or regulating unit disengages both couplers in the normal operating mode. This means that in the normal operating mode, of the motor vehicle can operated efficiently with reduced losses.

Further, it is proposed that the control and/or regulating unit selects the normal operating mode above the limit speed. This means that advantageously the vehicle can be operated at higher speeds more efficiently.

At least one of the two couplers is shiftable under load. This means that one of the couplers can advantageously be opened under load, which means that an irregular operating state can be prevented and/or overcome. "Shiftable under load" in this case is to be understood to mean in particular that the coupler can be opened while transmitting a torque. Preferably the coupler is merely disconnectable under load, i.e. engageable merely without load and only disengageable under load.

In addition, according to the invention a method for a motor vehicle drive train device, in particular for a motor vehicle drive train device with at least one main drive train which drives a main drive axle, with at least one auxiliary drive train which is driven via the main drive train and which drives a secondary drive axle is proposed, the secondary drive axle being driven by the auxiliary drive train without an axle differential.

The invention will become more readily apparent from the following description thereof of the with reference to accompanying drawings. The drawing, the description and the claims contain numerous features in combination. The person skilled in the art will expediently also consider the features individually and combine them to form useful further combinations.

BRIEF DESCRIPTION OF THE DRAWINGS the FIGURE shows a diagram of a motor vehicle drive train with a motor vehicle drive train device according to the invention

DESCRIPTION OF AN EXEMPLARY EMBODIMENT

A motor vehicle which is not illustrated in greater detail includes a motor vehicle drive train in the form of a truck drive train. The motor vehicle drive train comprises a main drive train 10 and an auxiliary drive train 12. The motor vehicle drive train has a main drive axle 11 which is permanently driven via the main drive train 10, and a secondary drive axle 13 which can be driven via the auxiliary drive train 12. The secondary drive axle 13 is linked to the auxiliary drive train 12 without an axle differential. The main drive train 10 comprises two drive wheels 21, 22 which can be driven by means of the main drive axle 11. The auxiliary drive train 12 has a first drive wheel 23 and a second drive wheel 24 which can be driven by means of the secondary drive axle 13. The motor vehicle can be driven by means of the drive wheels 21, 22, 23, 24.

The main drive train 10 permanently drives the main drive axle 11. The main drive train 10 has a drive shaft 25, a drive gear wheel 26, a final drive 27 and a differential lock 28. The drive shaft 25 introduces a torque into the motor vehicle drive train. The drive gear wheel 26 is driven via the drive shaft 25. The drive gear wheel 26 drives the final drive 27 of the main drive axle 11. The final drive 27 comprises a differential. The drive shaft 25 is always coupled to the final drive 27 of the main drive axle 11. The final drive 27 of the main drive axle 11 drives the drive wheels 21, 22 of the main drive axle 11. The differential lock 28, if engaged when required, locks the differential by connecting the drive wheels 21, 22 together for co-rotation. The drive shaft 25 is always coupled with the main drive axle 11 via the drive gear wheel 26.

The auxiliary drive train 12 has a coupling device 29 for linking the couplable secondary drive axle 13 to the main drive train or to the permanently driven main drive axle 11. The coupling device 29 links the auxiliary drive train 12 to the main drive train 10. The coupling device 29 is a multi-disk clutch, which has a plurality of disks, each of which has a friction lining, in order to produce a connection for co-rotation. In order to produce a frictional connection, the disks of the coupling device 29 are pressed against one another and the friction linings of the disks are in frictional contact.

The auxiliary drive train 12 has an auxiliary drive shaft 17, a first wheel drive shaft 15 and a second wheel drive shaft 16. For rigidly connecting the secondary drive axle 13 to the main drive train 10, the motor vehicle drive train has a conversion gear 14. The conversion gear 14 connects the auxiliary drive shaft 17 to the wheel drive shafts 15, 16 at synchronized speeds. The conversion gear 14 comprises two gear wheels 30, 31. The first gear wheel 30 is connected for co-rotation to the auxiliary drive shaft 17 and is formed as a bevel gear. The second gear wheel 31 is connected for co-rotation to the secondary drive axle 13 and is formed as a bevel gear. The first gear wheel 30 and the second gear wheel 31 mesh with one another and thus can transmit a torque from the auxiliary drive shaft 17 into the secondary drive axle 13.

In order to assume a differential functionality, the secondary drive axle 13 has a first coupler 18 and a second coupler 19. The couplers 18, 19 are arranged on the secondary drive axle 13 in the power train after the conversion gear 14. The coupler 18 is arranged in the power train between the conversion gear 14 and the first drive wheel 23. The coupler 19 is arranged in the power train between the conversion gear 14 and the second drive wheel 24. The couplers 18, 19 are in the form of positive dog clutches.

The wheel drive shaft 15 can be connected for co-rotation to the auxiliary drive shaft 17 by means of the coupler 18. The coupler 18 has two operating states. In a first operating state, the coupler 18 is opened. In the opened state, the wheel drive shaft 15 is separated from the auxiliary drive shaft 17. The coupler 18 is formed as a coupler which is shiftable under load. For this, the coupler 18, which is formed as a dog clutch, has for example a dog with a positive angle.

The wheel drive shaft 16 can be connected for co-rotation to the auxiliary drive shaft 17 by means of the coupler 19. The coupler 19 has two operating states. In a first operating state, the coupler 19 is opened. In the opened state, the wheel drive shaft 16 is separated from the auxiliary drive shaft 17.

The motor vehicle drive train device has a selector unit 32 for actuating the couplers 18, 19. The selector unit 32 has a 3-position cylinder. The selector unit 32 has 3 selection positions. In a first selection position, the coupler 18 and the coupler 19 are opened. In a second selection position, the coupler 18 is opened and the coupler 19 is closed. In a third selection position, the coupler 18 and the coupler 19 are closed. The selector unit 32 has a basic position in which it is in the non-actuated state. The basic position is formed as the first selection position. In principle, the selector unit 32 may also be constructed in a different way which appears sensible to the person skilled in the art, for example by means of two 2-position cylinders.

For automatic or automated actuation of the coupling device 29, the first coupler 18 and the second coupler 19 of the motor vehicle drive train, the motor vehicle drive train has a control and regulating unit 20. The selector unit 32 is controlled by means of the control and regulating unit 20. The control and regulating unit 20 is provided to regulate the engagement of the auxiliary drive train 12. The control and regulating unit 20 has three operating modes. The control and regulating unit 20 has a normal operating mode, a standby operating mode and an auxiliary operating mode, and is provided to implement one of the operating modes.

In the normal operating mode, the coupling device 29 is opened. No torque is transmitted to the auxiliary drive train 12. For the normal operating mode, the control and regulating unit 20 shifts the selector unit 32 into the first selection position. The couplers 18, 19 of the secondary drive axle 13 are opened, which means that the drive wheels 23, 24 can turn freely. The control and regulating unit 20 is provided to implement the normal operating mode from a limit speed of 30 km/h onwards.

In the standby operating mode, the control and regulating unit 20 is provided to close one of the two couplers 18, 19. For this, the control and regulating unit 20 in the standby operating mode shifts the selector unit 32 into the second selection position. In the standby operating mode, the coupling device 29 is opened. No torque can be transmitted from the drive shaft 25 to the auxiliary drive train 12. The coupler 18 is opened. No torque can be transmitted from the auxiliary drive shaft 17 to the wheel drive shaft 15. The coupler 19 is closed and connects the auxiliary drive shaft 17 for co-rotation to the wheel drive shaft 16. The control and regulating unit 20 is provided to trigger the standby operating mode only at a limit speed of below 30 km/h.

In the auxiliary operating mode, the coupling device 29 is closed. In the auxiliary operating mode, the control and regulating unit 20 is provided to close both couplers 18, 19. For this, the control and regulating unit 20 shifts the selector unit 32 in the auxiliary operating mode into the third selection position. The control and regulating unit 20 is provided to shift the auxiliary operating mode only at a speed of below 30 km/h and a recognized slip of the main drive axle 11, which corresponds to spinning of at least one of the drive wheels 21, 22.

The control and regulating unit 20 constantly senses, via a sensor system which is not illustrated in greater detail, a speed of the motor vehicle. If the control and regulating unit 20 recognizes that the speed is below the limit speed, it switches into the standby operating mode. For this, it shifts the selector unit 32 into the second selection position and thereby closes the coupler 19. The wheel drive shaft 16 is connected to the auxiliary drive shaft 17. The auxiliary drive shaft 17 is thereby rotated and has an identical speed to that of the drive wheel 24. The drive wheel 23 is separated from the auxiliary drive shaft 17. This means that a speed of the drive wheel 24 may be different from a speed of the drive wheel 23. A quasi differential functionality is provided thereby.

If the control and regulating unit 20 recognizes a slip of the main drive axle 11 during the standby operating mode, i.e. at a speed of the motor vehicle which is below the limit speed, the control and regulating unit 20 selects the auxiliary operating mode. For this, it shifts the selector unit 32 into the third selection position and thereby closes the coupler 18. The coupler 19 remains closed. The drive wheels 23, 24 are rigidly connected together by means of the couplers 18, 19. The control and regulating unit 20 closes the coupling device 29 and thus connects the auxiliary drive train 12 to the drive shaft 25. This means that the drive wheels 23, 24 are likewise driven and thus relieve the load on the drive wheels 21, 22, which are permanently connected to the drive shaft 25.

If the control and regulating unit 20 recognizes that the speed of the vehicle is greater than the limit speed, the control and regulating unit 20 switches from the auxiliary operating mode into the normal operating mode. For this, the control and regulating unit 20 shifts the selector unit 32 into the neutral position again. Both couplers 18, 19 are opened. In principle, the control and regulating unit 20 can also evaluate other or further switch-off parameters for switching off the auxiliary operating mode. For example, it is conceivable for the control and regulating unit to switch off the auxiliary operating mode if no slip of the main drive axle 11 occurs for a defined amount of time.

What is claimed is:

1. A motor vehicle drive train arrangement with a main drive train (10) connected to a main drive axle (11) for driving the main drive axle (11), and at least one auxiliary drive train (12) with an auxiliary drive shaft (17) connected to the main drive train (10) to be driven thereby and to a secondary drive axle (13) for driving the secondary drive axle (13) via the at least one auxiliary drive train (12), the at least one auxiliary drive train (12) including first and second wheel drive shafts (15, 16) which are connected to the auxiliary drive shaft (17) at a speed synchronized with the speed of the main drive axle (11), the secondary drive axle (13) being linked to the at least one auxiliary drive train (12) without an axle differential and the at least one auxiliary drive train (12) being linked to the main drive train (10) via a multi-disk clutch (29), and the first and second wheel drive shafts (15, 16) being provided with first and second couplers (18, 19) for selectively connecting at least one of the first and second wheel drive shafts (15, 16) to the at least one auxiliary drive train (12) so as to provide for a quasi differential functionality, and a control and regulating unit (20) programmed so as to select one of a normal operating mode, a standby operating mode and an auxiliary operating mode, depending on operating conditions and always subject to a vehicle speed limit and permit selection of the standby operating mode or the auxiliary operating mode only below a defined speed limit and selection of the normal operating mode only above the defined speed limit.

2. The motor vehicle drive train arrangement as claimed in claim 1, wherein the first coupler (18) and the second coupler (19) are dog clutches for connecting the first and second wheel drive shafts (15, 16) individually to the auxiliary drive shaft (17).

3. The motor vehicle drive train arrangement as claimed in claim 1, wherein in the standby operating mode one of the two couplers (18, 19) is opened and the other is closed.

4. The motor vehicle drive train arrangement as claimed in claim 1, wherein in the auxiliary operating mode both couplers (18, 19) are closed by the control and regulating unit (20).

5. The motor vehicle drive train arrangement at least as claimed in claim 4, wherein the control and regulating unit (20) is programmed to select the auxiliary operating mode dependent on a slip of the main drive axle (11).

6. The motor vehicle drive train arrangement as claimed in claim 1, wherein in the normal operating mode both couplers (18, 19) are opened.

7. The motor vehicle drive train arrangement as claimed in claim 1, wherein at least one of the two couplers (18, 19) is shiftable under load.

\* \* \* \* \*